United States Patent [19]

Bush et al.

[11] Patent Number: 4,581,894

[45] Date of Patent: Apr. 15, 1986

[54] HYDRAULIC COMPRESSION APPARATUS

[75] Inventors: Austin L. Bush, Birmingham; Kenneth P. Apperson, Chaulkville; Jerald C. Todd, Centerpoint, all of Ala.

[73] Assignee: Square D Company, Palatine, Ill.

[21] Appl. No.: 753,352

[22] Filed: Jul. 9, 1985

Related U.S. Application Data

[63] Continuation of Ser. No. 435,775, Oct. 1, 1982, abandoned.

[51] Int. Cl.[4] .............................................. F16D 31/02

[52] U.S. Cl. ........................................ 60/482; 60/478; 60/480; 72/453.16

[58] Field of Search ................. 60/477, 478, 480, 481, 60/482; 72/435.15, 435.16; 417/374, 568

[56] References Cited

U.S. PATENT DOCUMENTS 2,064,445 12/1936 Nilson .................................. 60/482
2,107,970 2/1938 Wells ..................................... 60/482
2,618,929 11/1952 Bidin .................................... 60/478
4,031,619 6/1977 Gregory ................................ 60/477
4,110,983 9/1978 Sherman ............................... 60/477
4,339,942 7/1982 Svensson .......................... 72/453.16

*Primary Examiner*—Charles T. Jordan
*Assistant Examiner*—Richard Klein
*Attorney, Agent, or Firm*—Stephen A. Litchfield

[57] ABSTRACT

A hydraulic apparatus for converting hydraulic pressure into mechanical movement for operating a tool or other device, operated by a pump block having a bore therein and a moveable plunger disposed within said bore. A cylinder is disposed over the pump block. The cylinder is captively held over the pump block and is moveable with respect thereto along the common axis. A fluid reservoir is defined between the cylinder and the pump block, and contains the hydraulic fluid. The plunger is operated by a pair of moveable arms secured to the apparatus and causes pressure to build in the fluid in an inlet chamber which communicates between the pump block and the cylinder. A pressure control valve is mounted adjacent the pump block and limits the hydraulic pressure which may be applied in the system. A release valve and apparatus is provided for releasing the hydraulic pressure and returning it to the reservoir.

7 Claims, 5 Drawing Figures

HYDRAULIC COMPRESSION APPARATUS

This application is a continuation of U.S. patent application Ser. No. 435,775, entitled Hydraulic Compression Apparatus, filed on Oct. 21, 1982 and abandoned Aug. 27, 1985.

BACKGROUND OF INVENTION

1. Field of the Invention

This invention pertains to hydraulic compression apparatus and more particularly to hydraulic compression apparatus used in hand operated, hydraulic compression tools adapted for compressing an electrical connector about a conductor.

2. Description of the Prior Art

A number of hydraulic compression apparatus have been developed for various needs. One of these needs is for use in a compression tool for compressing metal connectors about electrical conductors to form an electrical and structural connection between two conductors.

Conventional tools such as that shown in the patent issued to McDurmont issued Nov. 3, 1964, U.S. Pat. No. 3,154,981, show a hand operated hydraulic compression tool having two operating levers. As in most hydraulic tools one of the operating levers is rigidly fixed to the hydraulic section of the tool. Connected also to the hydraulic section is a movable, second lever which is joined to the pump plunger and is used to create a vacuum to draw and compress hydraulic fluid, or oil, for the operation of the tool. Because of the single, movable lever arrangement in traditional tools the force exerted on the pump plunger is limited by the force applied to the end of the single, movable lever multiplied by the mechanical advantage of the lever linkage. This means that the pump plunger must be of a small diameter to be operatable under the force applied by the lever and thus will compress smaller volumes of the reservoir fluid. Generally, the smaller the volume of fluid compressed, the smaller the incremental distance of travel of the tool compression head. In traditional tools this arrangement of a small lever force and small pump plunger diameter required many strokes of the handle lever to advance the tool head and complete a compression connection. Thus, to complete a single compression, or crimp, of a workpiece held in the tool head, multiple operations of the handle were required and a substantial amount of time for each crimp was used.

In the past, to remedy this situation some conventional tools utilized a rapid advance system. This rapid advance system comprised generally a means by which the reservoir fluid could be rapidly compressed, forcing fluid through the various compression chambers and rapidly advancing the tool head to the point where it first experienced resistance from the work piece. One such type of rapid advance system would use a plunger having two stepped portions, one having a smaller diameter than the other. When operated, both stepped portions of the plunger would operate to compell larger volumes of fluid towards the compression piston and thereby more rapidly advance the compression head until it met resistance from the workpiece to be compressed. When the compression head met resistance from the workpiece, only the smaller diameter, stepped portion would then operate to compress relatively smaller volumes of fluid and thus advance the tool head in relatively smaller increments.

In another rapid advance system one of the operating levers (generally the rigid lever) would be in threaded association with the fluid reservoir and would be turned to advance the fluid through the hydraulic system and compress the tool head until resistance from the workpiece was met.

Both types of systems for rapid advance of the tool head required extra, multiple parts for their operation. These extra parts added weight to the tool and increased its complexity. Due in part to these extra parts, conventional hydraulic tools weighed eleven or twelve pounds. Since these tools are used for long periods of time and often at uncomfortable angles by an operator the weight of the tool is of substantial importance.

Compression tools, to be operative, need a pressure relief valve to indicate to the operator when the required compression had been completed. This avoids over compressing the workpiece and straining the metal parts of the tool. Also, conventional tools require a means by which to return hydraulic fluid back to the reservoir after a compression has been completed, to ready the tool for another compression. Conventional tools required separate porting and parts for each of these functions. For example for the pressure relief system conventional tools would have a relief valve seat and pin with an additional seating ball and porting. For the return of fluid to the reservoir, conventional tools would have a toggle release arrangement or a release integral with a portion of the handle which when twisted would compress a ball in a ball seat to allow the oil to return to the reservoir. The separation of these two functions in conventional tools required additional parts, with additional assembly requirements and associated additional weight.

It is desirable in most compression tools to measure from time to time the maximum pressure exerted by the tool head on a workpiece before the relief valve assembly becomes operative. Some prior art tools have adapters for attaching a pressure gauge to the hydraulic section of the tool to read the maximum pressure. These adapters generally require extra porting of the pump block and additional valves and springs. These assemblies also add complexity to the tool and extra weight.

Many prior art hydraulic apparatus require the maintenance of a minimum volume of hydraulic fluid in two separate reservoirs in the tool, one is a supply reservoir from which fluid is drawn to be compressed. The other is a compression reservoir into which the fluid drawn from the supply reservoir is compressed. This increases the volume of the compression reservoir and forces the movement of a mechanical piece. The requirement of two separate reservoirs increases the weight and complexity of the tool and provides a risk that contaminent to either reservoir will impair operation of the apparatus.

Thus, there is a need in the field for a hand held compression apparatus in which the handle lever arrangement allows a relatively large degree of force to be exerted on the plunger and thereby allows the use of a large diameter plunger to compress relatively large volumes of hydraulic fluid per each compression stroke. Further, there is further a need in the field for a compression apparatus which will advance the tool head in relatively large increments to complete a compression without the need of a separate, rapid advance system. Further, there is a need in the field for a compression apparatus which will complete a compression of a workpiece with a minimum number of compression strokes of the operating levers. Further, there is a need in the field for a compression tool which is lightweight, easy to assemble and maintain and has relatively few moving parts. There is a further need in the field for a compression apparatus in which the pressure relief mechanism is integral with the oil return mechanism thereby eliminating the need for separate porting and separate parts for each of these functions. There is a need in the field for a compression tool which has an adapter assembly therein for the attachment of a pressure gauge where said adapter assembly requies few additional parts. There is also a need for a compression apparatus that does not require the maintenance of two separate reservoirs of hydraulic fluid each having a necessary constant minimum volume requirement.

SUMMARY OF THE INVENTION

It is a principle object of the present invention to provide a hydraulic compression apparatus for use in association with a crimping tool which will require a relatively small number of compression strokes to complete a compression of a work piece. It is another object of the invention to provide a compression apparatus for use in association with a compression tool which will advance the crimping head of the tool rapidly and thereby eliminate the need of a separate rapid advance system. It is a further object of the invention to provide a handheld compression apparatus able to compress a relatively large volume of hydraulic fluid.

The above objects are accomplished by providing a tool utilizing a double handle arrangement where each handle of the tool is movable with respect to the hydraulic compression apparatus of the tool. Each handle is connected to the hydraulic apparatus such that it acts as a fulcrum exerting force upon the plunger to compress the hydraulic fluid and cause the tool head to move. By providing such an arrangement the operator is able to exert a relatively greater force than prior art tools as both handles equally operate so as to move the plunger. This allows the use of a larger diameter plunger than previously used with prior art devices and thereby can draw greater volumes of fluid into the compression or vacuum chamber for the compression stroke. Since a larger volume of fluid is compressed in a single compression stroke of the tool than in prior art tools, a greater incremental advancement of the tool head with respect to the workpiece is realized. Thus, with the same amount of force that an operator would exert on a traditional tool having one rigid lever and one movable lever, the operator can exert almost double the force on the plunger to compress the fluid by virtue of the double acting fulcrum arrangement of the levers on the plunger. This arrangement allows the tool head to advance in relatively greater increments and eliminates the need for a rapid advance system. Also, this arrangement allows the compession of a workpiece with relatively fewer strokes of the tool levers.

It is another object of the present invention to provide a compression apparatus for use in a crimping tool in which the pressure relief valve is an integral arrangement with the hydraulic fluid return mechanism which returns hydraulic fluid to the reservoir after a compression has been achieved. This object is met by providing a relief valve assembly which is connectable to a pump block body and in which the hydraulic fluid from the compression stroke is forced against a spring biased, floating valve pin. The valve pin rests against a valve seat which has an opening connecting to the compression chamber. When the compression in the chamber reaches a predetermined level the spring loading of the relief valve plunger body is overcome and the valve pin separates from the valve seat. This allows the fluid under pressure in the compression chamber to run into the supply reservoir. This prevents any additional strokes of the levers from creating additional pressure in the compression chamber, and thereby prevents a work piece from being compressed past a preset compression rating. Once the compression process has been completed and it is desired to return the tool head to its open position, the same valve pin is used to allow the oil to flow back into the reservoir. This is accomplished by having a release plunger movably held in the pump block and aligned at one end with the valve pin. The release plunger in the pump block is aligned at its other end with the pump plunger and lever arrangement. The return mechanism is activated by over compressing the handles and pushing the pump plunger against the release plunger and thereby causing the release plunger to move the valve pin off of the valve seat. This opening of the valve pin releases the pressure in the fluid. Once the pressure is released, spring loading of the cylinder against the direction of compression movement of the head will return the head to its open position and thereby force oil out of the compression area and back into the reservoir area. The pump plunger is pushed against the release plunger by over compressing the handles together thereby pushing the pump plunger deeper into the compression chamber until it moves the release plunger. An elastomeric washer is placed between the plunger and the pump block to prevent over compression of the handles during normal compression. The washer is able to be elastically deformed by the over compression of the handles when it is desired to release the fluid and open the tool head. Thus, the dual function of providing a pressure relief mechanism and an oil return mechanism is accomplished with basically the same elements and with a minimum of additional parts in the pump block and valve body.

The above described arrangement allows the reservoir to be integral with the movable cylinder and the pump block and valve body. This allows the overall compression tool to be lighter and easier to maintain. By causing the cylinder to rest adjacent the pump block when the tool head is open, no second reservoir of fluid is maintained or required. The majority of the fluid is returned to the supply reservoir, with a minimal amount remaining in the compression chamber. This reduces the amount of fluid required by the tool and lessens the risk of contamination. Also, in the manufacture of the tool the number of assembly steps are reduced and are less complicated thereby allowing the compression apparatus of the tool to be assembled more efficiently and at a lower cost.

A pressure gauge adapter is connected to the plunger assembly and will communicate the internal hydraulic pressure of the tool to a pressure gauge by virtue of a hydraulic filled bore in said plunger.

Further objects and advantages of the described invention will become apparent as the following description proceeds. The features of novelty which characterize the invention will be pointed out with particularity in the claims annexed to and forming a part of this specification.

BRIEF DESCRIPTION OF SEVERAL VIEWS OF DRAWINGS

The features of the present invention, which are believed to be novel, are set forth with particularity in the appended claims. The invention together with further objects and advantages thereof, may best be understood by reference to the following description taken in conjunction with the accompanying drawings, and the several figures of which like reference numerals identified like elements, and in which:

DETAILED DESCRIPTION

Figure 1:
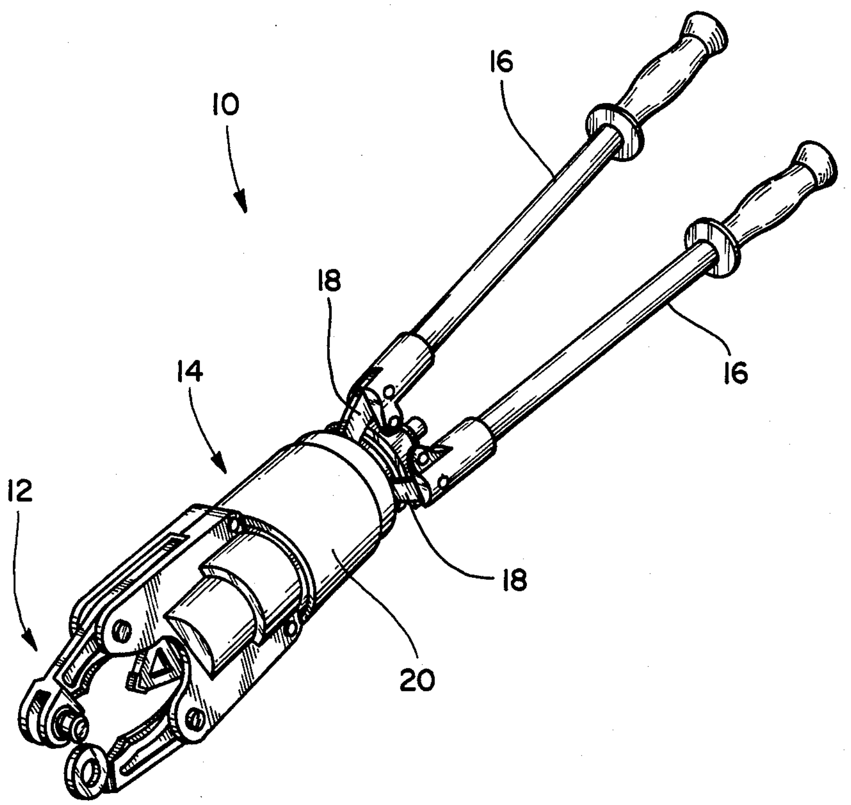
FIG. 1 is a perspective view of the hydraulic compression tool.

The hydraulic compression apparatus disclosed herein may form a useful part of many different types of applications. In the application shown in the drawings it is seen that the hydraulic apparatus is used in combination with a pair of operating levers and tool head to enable the tool head to compress an electrical connector to a conductor. While this embodiment is shown and disclosed herein, as the best mode of the invention, it is believed that this hydraulic apparatus may be adapted for use in a number of different applications.

Figure 2:
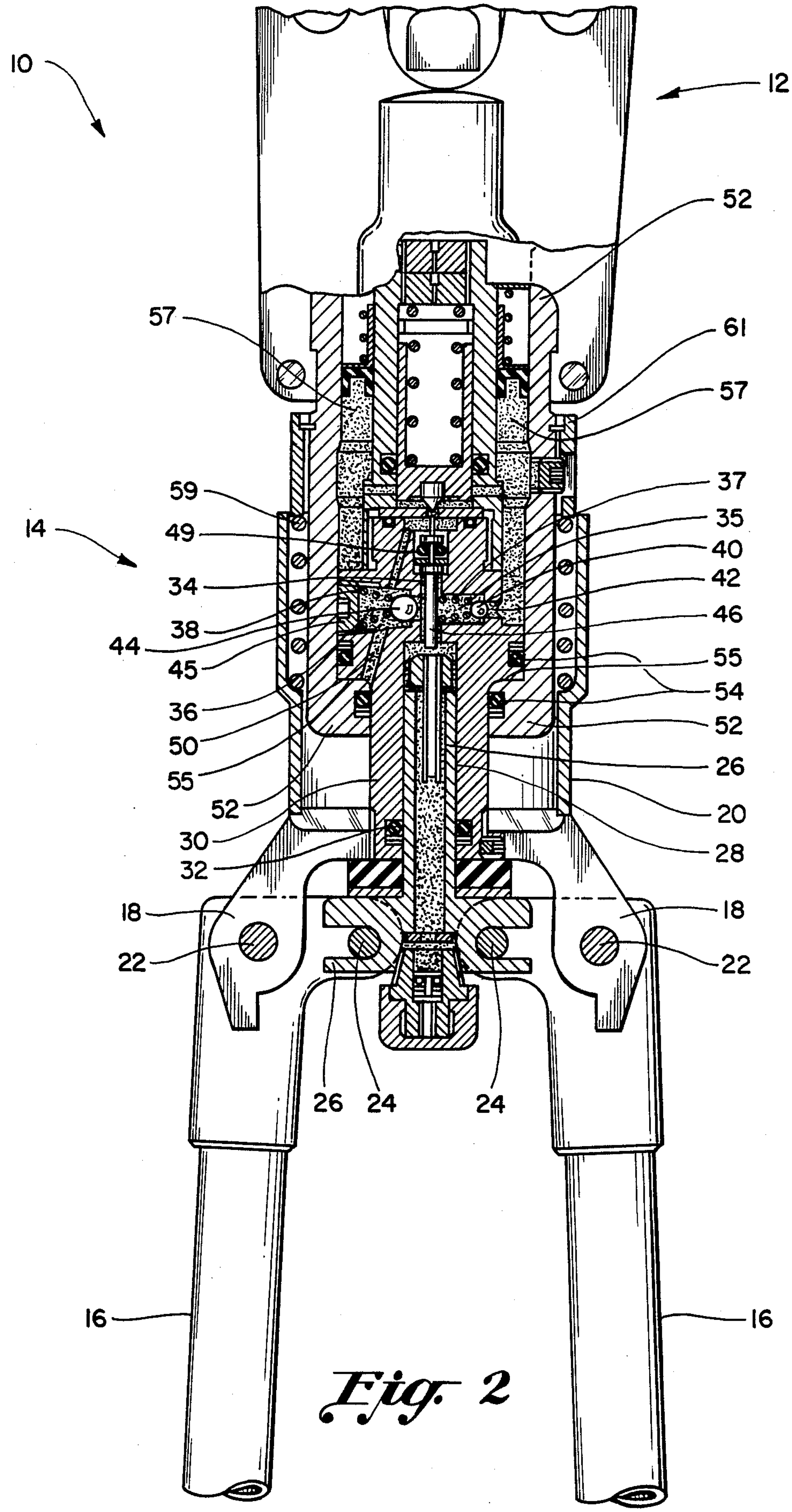
FIG. 2 is a side section view of the hydraulic apparatus of the tool showing the position of the components prior to the beginning of a compression process.

Referring now to FIG. 1 of the drawings, hydraulic hand tool 10 is shown having head section 12 hydraulic section 14 and operating levers 16. Operating levers 16 are connected to rigid base 18 which is in turn connected to collar shield 20 of hydraulic section 14. Referring now to FIG. 2, operating handles or levers 16 are joined at base 18 by fulcrum pins 22. Levers 16 are also designed so as to have portions extending between each end of base 18. Each of these portions have plunger pin 24 pivotally mated with pump plunger 26. It is seen in FIG. 2 that by connecting operating levers 16 to a fixed base 18 at fulcrum pins 22, the operation of arms 16 exerts force on plunger pins 24 and causes pump plunger 26 to move. This arrangement forms a fulcrum by each lever 16 to exert force on plunger 26.

Pump plunger 26 is movably inserted in bore 28 of pump block 30. O-ring seals 32 maintain an airtight relationship between pump plunger 26 and bore 28 in pump block 30.

Bore 28 communicates with bore 34 in pump block 30. Bore 34 has transverse hydraulic fluid chambers 35 and 36 communicating with bore 34 in pump block 30. Inserted in hydraulic fluid chambers 35 and 36 are ball compression springs 37 and 38. Hydraulic inlet ball 40 is compressed by spring 37 to seal hydraulic fluid inlet port 42. Compression ball 44 is compressed by spring 38 to seal chamber 36 from the entry of hydraulic fluid from chamber 35.

Bore 34 has release plunger 46 moveably disposed therein. Release plunger 46 is movable with respect to bore 34 and is held in place by collar 47 formed thereon. O-ring seals 49 provide an airtight sealing arrangement between bore 34 and release plunger 46. Pump block 30 also has drilled therein compression port 50. Compression port 50 communicates with hydraulic fluid chamber 36 and the outer body of pump block 30. Captively held around pump block 30 is cylinder 52. O-ring seals 54 provide an airtight sealing arrangement between portions of cylinder 52 and pump block 30.

It is seen that cylinder 52 is free to movably slide along pump block 30 within the limits defined by base 18 and edge 55 of pump block 30. Cylinder 52 has the same central axis as the central axis of pump block 30. Thus, movement of cylinder 52 is in parallel relationship with pump block 30 and with the axial alignment of the overall tool 10.

Cylinder 52 defines a cylindrical reservoir 57 around pump block 30. Reservoir 57 is filled with a suitable non-compressable hydraulic fluid which is prevented from entering chamber 35 by virtue of the spring biased inlet ball 40. Cylinder 52 is also spring biased such that, when not under compression, it is adjacent edge 55 of pump block 30. Collar spring 59 rests adjacent collar base 61 and is disposed between cylinder 52 and collar shield 20. It is seen that collar base 61 is connected to cylinder 52 and thereby causes cylinder 52 to remain adjacent edge 55 of pump block 30 by virtue of the spring force created by spring 59.

Figure 3:
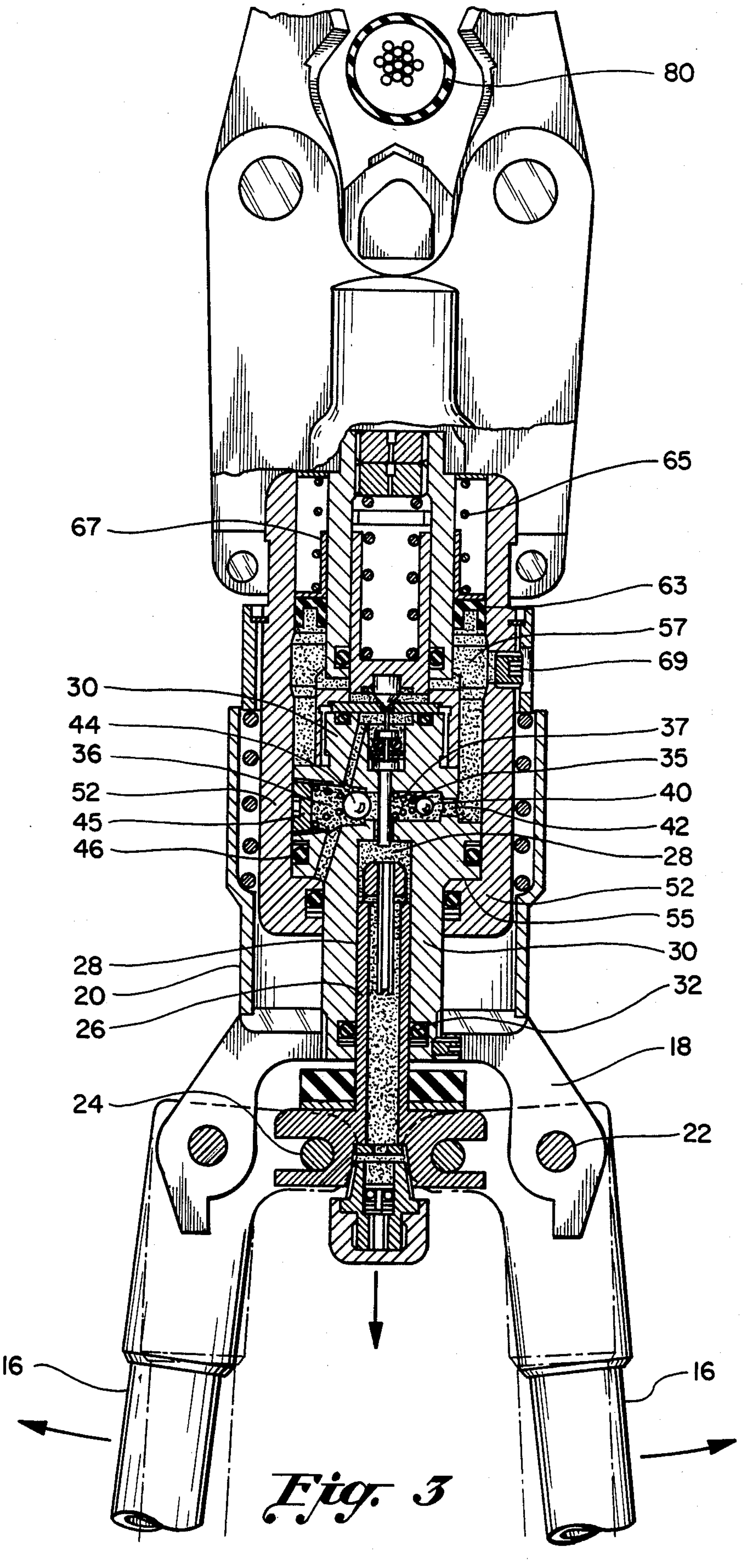
FIG. 3 illustrates a side section view of the compression apparatus showing the position of the elements upon the opening of the levers.

Referring now to FIG. 3, reservoir 57 is defined at its elongate ends by cylinder 52 and pump block body 30. At its upper most end reservoir 57 has cylindrical U-cup 63 which is spring biased by virtue of reservoir spring 65 to maintain a constant pressure on the hydraulic fluid in reservoir 57 such that the reduction of the hydraulic fluid from the reservoir during the compression process will be compensated for by the spring action on U-cup 63. Thus, a constant, minimal pressure is always maintained upon the hydraulic fluid in reservoir 57. This minimal pressure helps prevent air from entering the reservoir area and other portions of the system.

U-cup guide 67 provides a means by which the spring force from reservoir spring 65 is exerted across the width of U-cup 63 and thereby better facilitates the maintenance of pressure on reservoir 57.

FIG. 3 illustrates the hydraulic apparatus upon the completion of an induction stroke with operating levers 16. It is seen that operating levers 16 are moved away from each other thereby causing the fulcrum arrangement between base 18 and plunger pins 24 to move plunger 26 out of bore 28. Due to the airtight sealing arrangement between plunger 26 and bore 28, caused by O-ring seals 32, a vacuum is created in chamber 35. When the pressure in reservoir 57 in combination with the vacuum in chamber 35 exceeds the spring force of compression spring 37 on inlet ball 40, spring 37 is compressed against release plunger 46 thereby unseating inlet ball 40 from inlet port 42. This opens chamber 35 to reservoir 57 and allows hydraulic fluid to enter chamber 35. As the hydraulic fluid enters chamber 35 the volume of fluid contained in reservoir 57 decreases. Proportional to this decrease in fluid, U-cup 63, due to its spring biasing, moves a proportional distance towards inlet port 42 to maintain the minimal pressure on the hydraulic fluid in reservoir 57. Reservoir 57 is capped by plug 69 which serves as a means for draining and filling hydraulic fluid into reservoir 57.

Figure 4:
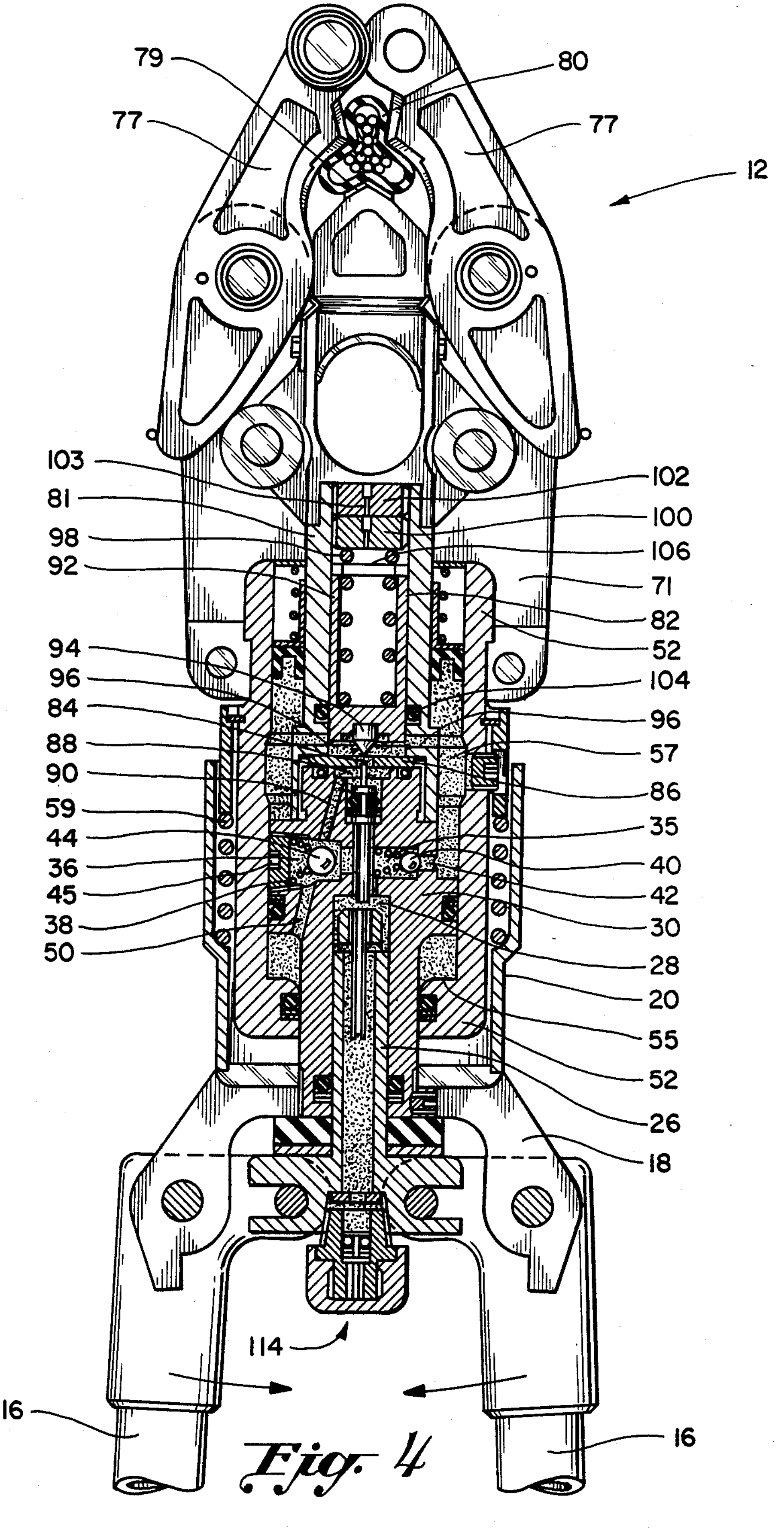
FIG. 4 illustrates a side section view of the compression apparatus after the completion of a compression stroke and also illustrates the operation of the tool head.

After completion of the induction stroke of operating levers 16, a compression stroke is then made with levers 16. FIG. 4 illustrates the hydraulic apparatus after completion of a compression stroke. It is seen that by making the compression stroke, i.e., moving levers 16 back towards one another, the hydraulic fluid in bore 28 is compressed by plunger 26. This compression accomplishes two functions. First, it serves to force inlet ball 40 back into a sealing position with inlet port 42. This prevents any hydraulic fluid in chamber 35 and bore 28 from returning to reservoir 57. Secondly, the hydraulic fluid in chamber 35 and bore 28 is forced against compression ball 44. When the force of this compression overcomes the spring biasing of compression spring 38, compression ball 44 is unseated from its sealing arrangement with chamber 35 and allows the compressed fluid to be introduced into chamber 36. As the fluid enters chamber 36 it also enters compression port 50. As the pressure in chamber 36 and, hence port 50, increases due to the completion of the compression stroke by operating levers 16, cylinder 52 is pushed down and away from edge 55 of pump block body 30. Thus, hydraulic fluid fills the cylindrical chamber formed by the movement of cylinder 52 away from edge 55. This draws cylinder 52 down towards base 18 and causes movement of cylinder 52 with respect to pump block 30. As can be further seen in FIG. 4, cylinder 52 is captively connected to tool head 12 at head cover 71. It is seen that by moving cylinder 52 towards base 18 head cover 71 is moved with cylinder 52 in the same direction. Arms 77 are rotably pinned to head cover 71 such that when head cover 71 moves towards base 18 with cylinder 52, arms 77 are moved against internal rollers (not shown) causing arms 77 to converge towards the compression point 79 rigidly mounted to the internal rollers. This movement of arms 77 by the movement of cylinder 52 causes the compression of workpiece 80 held between arms 77 and compression point 79.

The completion of a single compression stroke by operating levers 16 moves arms 77 towards each other a predetermined amount. Completion of successive induction and compression strokes by operating levers 16 moves cylinder 52 greater distances from edge 55 of pump block 30 due to the increased compression of additional volumes of hydraulic fluid.

Upon the completion of a compression stroke and the beginning of another induction stroke compression ball 44, due to its spring biasing will seal chamber 35 from chamber 36, as shown in FIG. 3. This allows the pressure in chamber 36 to remain constant while more hydraulic fluid is drawn into chamber 35 by the induction stroke of operating levers 16. A subsequent compression stroke of operating levers 16 forces additional fluid into chamber 36 and port 50 thereby increasing the volume in the chamber and the pressure. This increase causes additional movement of cylinder 52 with respect to edge 55 of pump block 30. Assembly plug 45 is threaded into chamber 36 of pump block 30 from the outside portion of pump block 30. Spring 38 rests between assembly plug 45 and compression ball 44. Assembly plug 45 allows for easy assembly of inlet ball 40, compression spring 37, compression ball 44 and compression spring 38. Also, assembly plug 45 facilitates the maintenance and replacement of the ball 40 and spring 38.

Referring back to FIG. 4, valve body 81 is shown threaded to pump block 30. Valve body 81 has bore 82 therein which communicates with bore 84 contained in valve seat 86. Valve seat 86 is disposed between valve body 81 and pump block 30. Bore 84 of valve seat 86 communicates with pressure relief chamber 88 in pump block 30. Pressure relief port 90 connects chamber 36 with pressure relief chamber 88. Bore 82 of valve body 81 has relief valve plunger body 92 moveably inserted therein. Valve pin 94 is disposed between relief valve plunger body 92 and valve seat 86. Valve pin 94 communicates with bore 84 and valve seat 86 so as to seal pressure relief chamber 88.

Valve body 81 has hydraulic fluid return ports 96 therein. Valve spring 98 is disposed within relief valve plunger body 92 and spring biases relief valve plunger body 92 towards valve seat 86. This spring biasing causes valve pin 94 to remain in bore 84 of valve seat 86 and thereby causes valve pin 94 to seal pressure relief chamber 88. Adjusting screw 100 mates with a threaded section inside bore 82 of valve body 81. Adjusting screw 100 allows the spring force on valve plunger body 92 to be varied. Lock screw 102 locks adjusting screw 100 in place once an adjustment has been made. Air relief passages 103 allow air to enter the spring area of relief valve plunger body 92 and to escape relief valve plunger body 92 as the valve 92 moves within bore 82. O-ring seals 104 provide an airtight sealing arrangement between bore 82 and relief valve plunger body 92. Movement of relief valve plunger body 92 within bore 82 is restricted at one end by valve seat 86. Movement of relief valve plunger body 92 is restricted at its other end by shoulder 106 formed on bore 82 of valve body 81.

After the completion of an induction stroke by operating levers 16 and upon a compression stroke hydraulic fluid will enter chamber 36 and compression port 50. Since pressure relief port 90 also communicates with chamber 36 hydraulic fluid will be forced into pressure relief port 90 and hence into pressure relief chamber 88. The pressure of the hydraulic fluid in pressure relief port 90 and pressure relief chamber 88 will be the same as the pressure on the hydraulic fluid in chamber 36 and compression port 50. As this hydraulic pressure builds with successive compression strokes of operating levers 16, the pressure in pressure relief chamber 88 also increases. When this pressure overcomes the spring force exerted by valve spring 98 against relief valve plunger body 92, relief valve plunger body 92 is moved towards shoulders 106. This movement causes floating valve pin 94 to unseat from bore 84 of valve seat 86. This unseating releases the pressure in pressure relief chamber 88, pressure relief port 90, chamber 36, compression port 50 and the area between cylinder 52 and edge 55 of pump block 30. Thus, this unseating of valve pin 94 allows hydraulic fluid to pass from the pressure relief chamber 88 through hydraulic fluid return port 96 and back into reservoir 57. This return of hydraulic fluid will continue as long as the pressure in pressure relief chamber 88 exceeds the spring force exerted by valve spring 98. Once the pressure in pressure relief chamber has decreased, valve pin 94 will close back over bore 84 of valve seat 86 thereby sealing pressure relief chamber 88. This reseating of valve pin 94 maintains the relationship of cylinder 52 with respect to edge 55 of pump block 30 and maintains head section 12 in a closed position.

The unseating of valve pin 94 occurs rapidly and relief valve plunger body 92 is rapidly compelled towards shoulder 106. This causes an audible noise when the end of relief valve plunger body 92 strikes the shoulder 106. This audible noise tells the operator of the tool 10 that maximum compression has been achieved. If the operator makes successive strokes after the unseating of valve pin 94 no further compression of head 12 is achieved as the hydraulic fluid being compressed by plunger 26 is merely passed through the relief valve assembly to reservoir 57. This arrangement prevents excessive compression of the workpiece and excessive loading of the parts of tool assembly. By varying the position of adjusting screw 100 the spring force in valve pin 94 can be adjusted to vary the pressure at which the relief valve assembly will operate.

Once maximum compression has been reached and the pressure in relief pressure chamber 88 has decreased due to the unseating of valve pin 94, it will be desired to reopen the head section 12 to allow withdrawal of the workpiece 80. Thus, it will be desired to return the hydraulic section 14 of tool 10 to its initial status with cylinder 52 adjacent edge 55 of pump block 30. This is uniquely accomplished by utilizing the same relief valve assembly which is used to prevent the tool from compressing a workpiece beyond a maximum compression setting.

Figure 5:
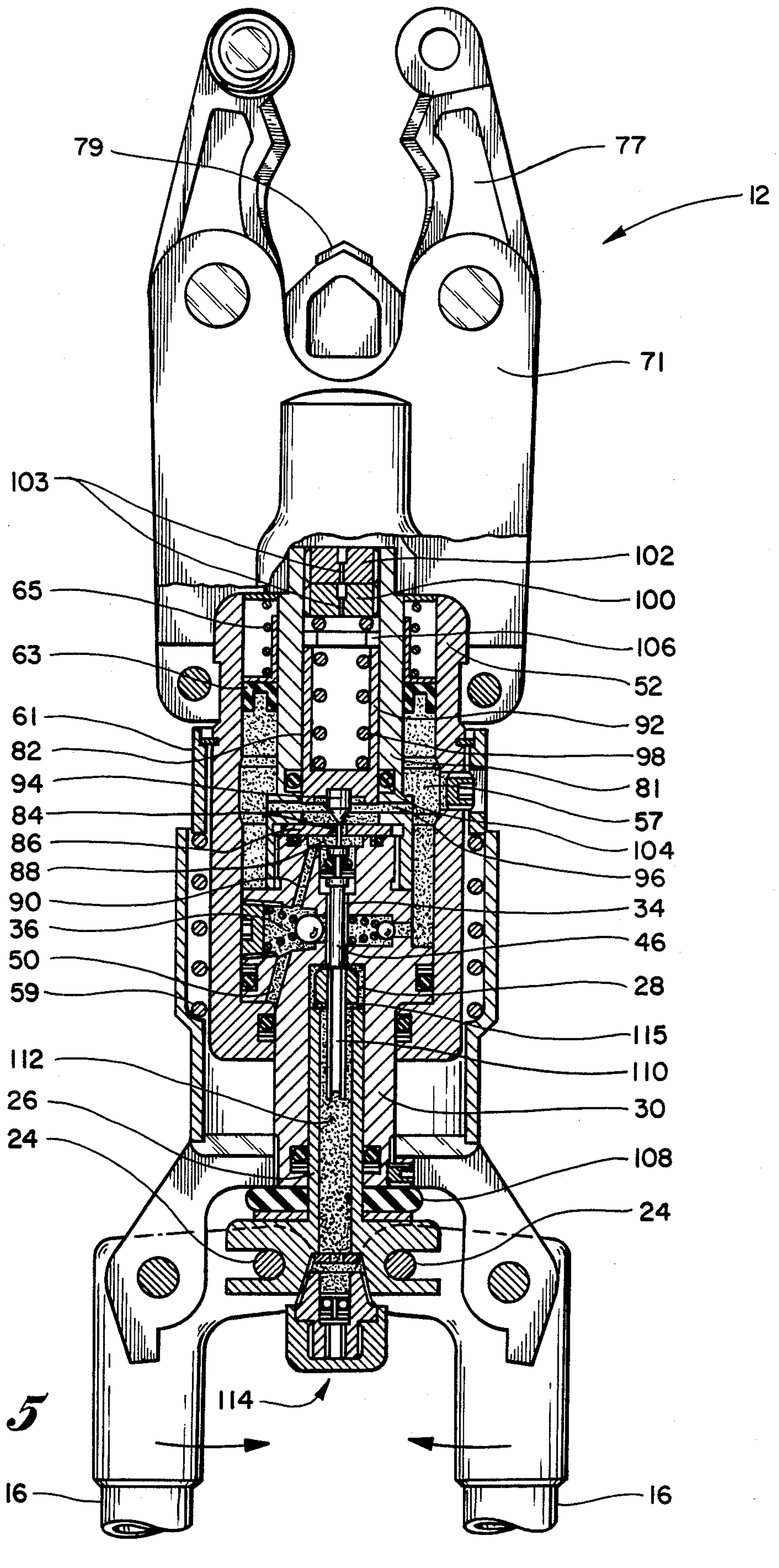
FIG. 5 illustrates a side view of the operation of the hydraulic fluid return after a compression has been achieved.

FIG. 5 illustrates the operation of the hydraulic fluid return mechanism. To accomplish the return of cylinder 52 to edge 55 of pump block 30, operating levers 16 are pushed towards each other such that the portion of the arms around plunger pins 24 are compressed against elastemeric plunger washer 108. Plunger washer 108 is made of an elastic material such that when operating levers 16 are moved together the fulcrum action on plunger pins 24 deforms washer 108 and causes plunger 26 to move well within pump bore 28. Release plunger 46 is movably held in bore 34 of pump block 30 with one end adjacent the end of plunger 26. The other end of release plunger 46 is adjacent the valve pin 94 of relief valve plunger body 92. When pump plunger 26 is pushed by operating levers 16 against release plunger 46, release plunger 46 is moved within bore 34 to unseat valve pin 94. The unseating of valve pin 94 opens pressure relief chamber 88 to hydraulic fluid return port 96 and reservoir 57. Valve pin 94 will remain unseated as long as levers 16 are compressed together. The spring biasing of cylinder 52 by virtue of collar spring 59 will cause cylinder 52 to move adjacent edge 55 of pump block 30 when valve pin 94 is maintained in an unseated relationship with valve seat 86, thereby allowing the spring force of collar spring 59 to compel hydraulic fluid contained between cylinder 52 and edge 55 through compression port 50, chamber 36, pressure relief port 90, pressure relief chamber 88, through hydraulic fluid return port 96 and finally into reservoir 57. This increase in volume in reservoir 57 causes cylindrical U-cup 63 to compress resevoir spring 65 and thereby allow hydraulic fluid to fill reservoir 57. The spring biasing of collar spring 59 against collar base 61 which is connected to cylinder 52 will overcome the downward spring biasing of reservoir spring 65 against cylindrical U-cup 63 and thereby moves cylinder 52 towards edge 55 of pump block 30. This movement of cylinder 52 will move head cover 71 and hence spring loaded arms 77 away from compression point 79. This movement will open the tool head section 12 to release the workpiece 80 compressed therein and to ready the tool for another compression process.

The above described embodiment shows that the hydraulic fluid return assembly is an integral part of the relief valve assembly. Hydraulic fluid return to the reservoir 57 is accomplished through the same mechanism that causes the release of hydraulic pressure when a maximum pressure level has been reached. This combination of functions reduces the number of parts needed to perform these functions and allows for a lighter weight and easier to assemble hydraulic apparatus.

Plunger adjusting screw 110 is disposed inside of a bore 112 in plunger 26. Screw 110 is threadedly received in plunger 26 such that its end forms an adjustment of the hydraulic fluid return mechanism. By turning screw 110 further into plunger 26, release plunger 46 can be operated to unseat valve pin 94 with less compressive action of operating levers 16. In this manner, the hydraulic fluid return mechanism can be tuned so that it is operable without an excessive amount of force on operating levers 16 and so that it does not operate the mechanism during a normal compression stroke.

Capping bore 112 in plunger 26 is pressure valve adapter assembly 114. Assembly 114 allows a pressure gauge (not shown) to be attached to the assembly 114 to test the relief pressure at which the valve pin 94 and relief valve assembly operates. This pressure valve adapter assembly 114 allows for fast and efficient field checking of the pre-set relief valve pressure.

Port 115 allows hydraulic fluid from bore 28 to enter and fill bore 112 of plunger 26. Since bore 112 is always open via port 115 to bore 28, the pressure of the hydraulic fluid in bore 28 upon a compression stroke of operating levers 16 will be the same in the bore 112. Thus, by connecting a pressure gauge to the adapter assembly 114 the pressure in bore 112 is communicated to the gauge and expressed as a pressure reading on the gauge. This pressure reading will accurately reflect the pressure in the system as a workpiece is compressed due to the communication of bore 28 with chamber 36 when compression ball 44 is opened on a compression stroke. The maximum pressure existing in the bore 112 just prior to the operation of the relief valve assembly will register on the gauge and will indicate to the operator the maximum pressure exerted by the tool in a workpiece.

This invention is not limited to the particular details of the apparatus depicted and other modifications and amplifications are contemplated. For example, the very same above-described hydraulic apparatus can be used in association with other type tool heads to urge a compression die towards a nest. Also, applications of the apparatus outside of the compression tool industry are possible. Other changes may be made in the above-described apparatus without departing from the true spirit and scope of the invention herein described. It is intended therefore that the subject matter in the above depiction shall be interpreted as illustrative and not in a limiting sense.

We claim:

1. Hydraulic apparatus for converting hydraulic pressure into linear, mechanical movement comprising,
  - a pump block having a bore therein,
  - a cylinder disposed over said pump block and having a common axis therewith, said cylinder captively held over said pump block and moveable with respect to said pump block along said common axis,
  - a reservoir defined between said cylinder and said pump block,
  - a fluid contained in said reservoir,
  - a vacuum chamber in said bore communicating with said pump block and said reservoir,
  - a plunger moveably disposed in the bore, whereby operation of the plunger in one direction within the bore creates a vacuum in the vacuum chamber and draws the fluid into the vacuum chamber; and whereby operation of the plunger in a direction opposite that of said one direction seals the fluid in said vacuum chamber and creates pressure in the sealed fluid;

means for operating said plunger attached to said plunger such that operation of the plunger creates sufficient hydraulic pressure in the vacuum chamber to move said cylinder with respect to said pump block along said common axis in a singular direction, means for preventing the hydraulic pressure in said fluid from exceeding a predetermined pressure level, said hydraulic prevention means, including a valve body having a bore therein secured to said pump block, a valve seat disposed between said valve body and said pump block a relief valve plunger body moveably inserted in said bore, a valve seat disposed between said relief valve plunger body and said pump block, a valve pin disposed between said valve seat and located in said relief valve plunger body, said valve seat having a bore therein communicating with the bore in said pump block, means for biasing said valve pin over said valve seat bore, a hydraulic fluid return port in said valve body communicating with said reservoir at one end and closed by said relief valve plunger body at another end;

means for reversing the direction of movement of said cylinder with respect to said pump block and for returning the hydraulic fluid to said reservoir, said reversing and return means integral with said hydraulic pressure prevention means and including means for unseating said valve pin from said valve seat bore for a controllable period of time said unseating means operable by said means for creating hydraulic pressure in said fluid.

2. The apparatus of claim 1 where said plunger operation means comprises a pair of levers each pivotally connected by a pin to a base adjacent said pump block, said levers forming a fulcrum and each having a portion connected to the plunger such that operation of the levers moves the plunger within the bore.

3. The apparatus of claim 1 where the means for unseating the valve pin from the valve seat bore comprises a release plunger having two ends and movably held in the pump block such that one end of the release plunger is adjacent the plunger, and the other end of the release plunger is adjacent the valve pin and the valve seat bore, such that operation of the plunger in an extreme direction towards the valve body moves the release plunger adjacent the valve pin and unseats the valve pin from the valve seat.

4. The apparatus of claim 1 where the valve pin biasing means comprises a spring mounted in said valve body bore and adjacent said relief valve plunger body, said spring compressively mounted in said valve body bore to maintain a predetermined compressive force against the relief valve plunger body such that said compressive spring force biases the valve pin in the valve seat bore.

5. The apparatus of claim 4 including means for adjusting the compressive spring force in the valve body bore such that the pressure at which the valve pin will unseat from the valve seat bore can be adjusted.

6. The apparatus of claim 5 where the compressive spring force adjusting means comprises an adjusting screw threaded into the valve body bore at an end of the bore distal from the valve seat and over the spring and relief valve plunger body, said adjusting screw turnable into or out of the bore such that the compressive spring force of the spring can be varied.

7. Th apparatus of claim 6 including a locking screw threaded into the valve body bore over the adjusting screw such that the locking screw prevents movement of the adjusting screw within the valve body bore.

* * * * *